US012755404B2

(12) United States Patent
Muhleman et al.

(10) Patent No.: US 12,755,404 B2
(45) Date of Patent: Oct. 6, 2026

(54) OPTICAL SURVEILLANCE SYSTEM FOR DETECTING AIRBORNE OBJECTS AND METHOD FOR DETECTING AIRBORNE OBJECTS

(71) Applicant: The United States of America as represented by the Secretary of the Navy, San Diego, CA (US)

(72) Inventors: Daniel Howard Muhleman, El Cajon, CA (US); Daniel Edward Cunningham, Ramona, CA (US)

(73) Assignee: United States of America, as represented by the Secretary of the Navy, Washington, DC (US)

(*) Notice: Subject to any disclaimer, the term of this patent is extended or adjusted under 35 U.S.C. 154(b) by 267 days.

(21) Appl. No.: 18/660,686

(22) Filed: May 10, 2024

(65) Prior Publication Data

US 2026/0017807 A1 Jan. 15, 2026

(51) Int. Cl.
*G06K 9/00* (2022.01)
*G06T 7/207* (2017.01)
(Continued)

(52) U.S. Cl.
CPC .............. *G06T 7/292* (2017.01); *G06T 7/207* (2017.01); *G06T 7/251* (2017.01); *G06V 20/52* (2022.01);
(Continued)

(58) Field of Classification Search
CPC ......... G06T 7/292; G06T 7/207; G06T 7/251; G06T 2207/10036; G06T 2207/20016;
(Continued)

(56) References Cited

U.S. PATENT DOCUMENTS 8,411,146 B2 4/2013 Twede
9,989,625 B2 6/2018 Aycock et al.
(Continued)

FOREIGN PATENT DOCUMENTS

EP 2439716 B1 9/2011

OTHER PUBLICATIONS

Islam, Md Nazrul, Murat Tahtali, and Mark Pickering. "Man-made object separation using polarimetric imagery." SPIE Future Sensing Technologies. vol. 11197. SPIE, 2019. (Year: 2019).*
(Continued)

*Primary Examiner* — Gregory A Morse
*Assistant Examiner* — Owais I Memon
(74) *Attorney, Agent, or Firm* — Naval Information Warfare Center Pacific; Kyle Eppele

(57) ABSTRACT

An optical surveillance system for detecting airborne objects and method for detecting airborne objects. A method and system comprising recording image data of an area of interest, wherein the image data comprises a plurality of concurrent images associated with at least two states of polarization, aligning the plurality of concurrent images with respect to the area of interest, determining a pixel-intensity for each of a plurality of pixels within the plurality of concurrent images, calculating a plurality of differential pixel intensities between at least one of the plurality of concurrent images associated with a first polarization state and at least one of the plurality of concurrent images associated with a second polarization state, determining a
(Continued)

plurality of pixel clusters associated the plurality of differential pixel intensities exceeding an airborne object threshold, and identifying the plurality of concurrent images associated with the plurality of pixel clusters exceeding the airborne object threshold.

13 Claims, 6 Drawing Sheets

(51) Int. Cl.

| | |
|---|---|
| ***G06T 7/246*** | (2017.01) |
| ***G06T 7/292*** | (2017.01) |
| ***G06V 20/52*** | (2022.01) |
| ***G06V 20/58*** | (2022.01) |

(52) U.S. Cl.
CPC .... *G06V 20/58* (2022.01); *G06T 2207/10036* (2013.01); *G06T 2207/20016* (2013.01)

(58) Field of Classification Search
CPC ........ G06V 20/52; G06V 20/58; G06V 20/13; G06V 20/17
See application file for complete search history.

(56) References Cited

U.S. PATENT DOCUMENTS

| | | | | |
|---|---|---|---|---|
| 2015/0023553 | A1* | 1/2015 | Rosario | G06V 10/147<br>382/103 |
| 2018/0005012 | A1* | 1/2018 | Aycock | G01J 4/04 |
| 2018/0096610 | A1* | 4/2018 | Ray | G08G 5/51 |
| 2019/0174077 | A1* | 6/2019 | Mitani | G06T 3/4038 |
| 2019/0325254 | A1* | 10/2019 | Jorquera | G06F 16/583 |
| 2024/0378857 | A1* | 11/2024 | Fan | G06V 20/52 |

OTHER PUBLICATIONS

Beninati, Anthony, et al. "Neuromorphic Architectures for Space Internet of Things (IoT)." 2023 IEEE International Conference on Imaging Systems and Techniques (IST). IEEE, 2023. (Year: 2023).*
Sun, W., G. Videen, and M. I. Mishchenko (2014), Detecting super-thin clouds with polarized sunlight, Geophys. Res. Lett., 41, 688-693, doi:10.1002/2013GL058840.
Yongqiang Zhao, Qunnie Peng, Chen Yi, Seong G. Kong, "Multiband Polarization Imaging", Journal of Sensors, vol. 2016, Article ID 5985673, 10 pages, 2016. https://doi.org/10.1155/2016/5985673.

* cited by examiner

OPTICAL SURVEILLANCE SYSTEM FOR DETECTING AIRBORNE OBJECTS AND METHOD FOR DETECTING AIRBORNE OBJECTS

STATEMENT REGARDING FEDERALLY SPONSORED RESEARCH AND DEVELOPMENT

The United States Government has ownership rights in this invention. Licensing inquiries may be directed to Office of Research and Technical Applications Naval Information Warfare Center Pacific, Code 72120, San Diego, CA, 92152; telephone (619) 553-5118; email: NIWC Pacific T2@us.navy.mil, referencing Navy Case No. 211,612.

BACKGROUND

When sunlight reflects or refracts from flat surfaces, it can become polarized. For natural aerial objects, such as birds and clouds, polarization does not typically occur due to the general absence of smooth planar surfaces. On the other hand, man-made objects such as unmanned aerial vehicles or balloons often have sizable surfaces capable of substantially polarizing the reflected/refracted light that emanates from them. These man-made objects are challenging to detect with traditional airspace surveillance systems, such as radar, because of their size, speed, and obfuscating environmental conditions or natural objects. There is a need to be able to readily and automatically distinguish between clouds and man-made objects to improve the ratio of valid detections of man-made objects relative to invalid detections (e.g. of clouds, birds, etc.).

SUMMARY

According to illustrative embodiments, a plurality of cameras having at least two states of polarization configured to record image data of an area of interest; an object identification unit, configured to receive and store image data, the image data further comprising a plurality of concurrent images, and characterize a plurality of pixel clusters within the plurality of concurrent images suggestive of an object based on variables comprising image recognition, velocity, and trajectory; identifying the plurality of pixel clusters suggestive of an object; and an image processing unit, configured to receive and store image data comprising a plurality of concurrent images associated with the at least two states of polarization, align the plurality of concurrent images with respect to the area of interest, determine a pixel-intensity for each of a plurality of pixels within the plurality of concurrent images, calculate a plurality of differential pixel intensities between at least one of the plurality of concurrent images associated with a first polarization state and at least one of the plurality of concurrent images associated with a second polarization state, determine a plurality of pixel clusters associated the plurality of differential pixel intensities exceeding an airborne object threshold, wherein the airborne object threshold is relative to the underlying scene, and identify the plurality of concurrent images associated with the plurality of pixel clusters exceeding the airborne object threshold.

In another embodiment, a method for detecting airborne objects comprising recording image data of an area of interest, wherein the image data comprises a plurality of concurrent images associated with at least two states of polarization, aligning the plurality of concurrent images with respect to the area of interest, determining a pixel-intensity for each of a plurality of pixels within the plurality of concurrent images, calculating a plurality of differential pixel intensities between at least one of the plurality of concurrent images associated with a first polarization state and at least one of the plurality of concurrent images associated with a second polarization state, determining a plurality of pixel clusters associated the plurality of differential pixel intensities exceeding an airborne object threshold, and identifying the plurality of concurrent images associated with the plurality of pixel clusters exceeding the airborne object threshold.

In one embodiment, an imaging system for detecting airborne objects, the system comprising: a plurality of cameras having at least two states of polarization configured to record image data of an area of interest; an image processing unit, configured to receive and store image data comprising a plurality of concurrent images associated with the at least two states of polarization, align the plurality of concurrent images with respect to the area of interest, determine a pixel-intensity for each of a plurality of pixels within the plurality of concurrent images, calculate a plurality of differential pixel intensities between at least one of the plurality of concurrent images associated with a first polarization state and at least one of the plurality of concurrent images associated with a second polarization state, determine a plurality of pixel clusters associated the plurality of differential pixel intensities exceeding an airborne object threshold, wherein the airborne object threshold is relative to the underlying scene, and identify the plurality of concurrent images associated with the plurality of pixel clusters exceeding the airborne object threshold.

It is an object to provide an optical surveillance system for detecting airborne objects and method for detecting airborne objects that offers numerous benefits, including enabling better differentiation of natural versus man-made objects in the sky by capturing a plurality of concurrent images of a scene from different optics with either a combination of a non-polarized and one or more polarized lenses (or optic with a polarized filter), or solely multiple distinct polarizations.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The accompanying drawings, which are incorporated in and form a part of the specification, illustrate example embodiments and, together with the description, serve to explain the principles of the invention. Throughout the several views, like elements are referenced using like references. The elements in the figures are not drawn to scale and some dimensions are exaggerated for clarity. In the drawings.

DETAILED DESCRIPTION OF EMBODIMENTS

The disclosed system and methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other system and methods described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Figure 1:
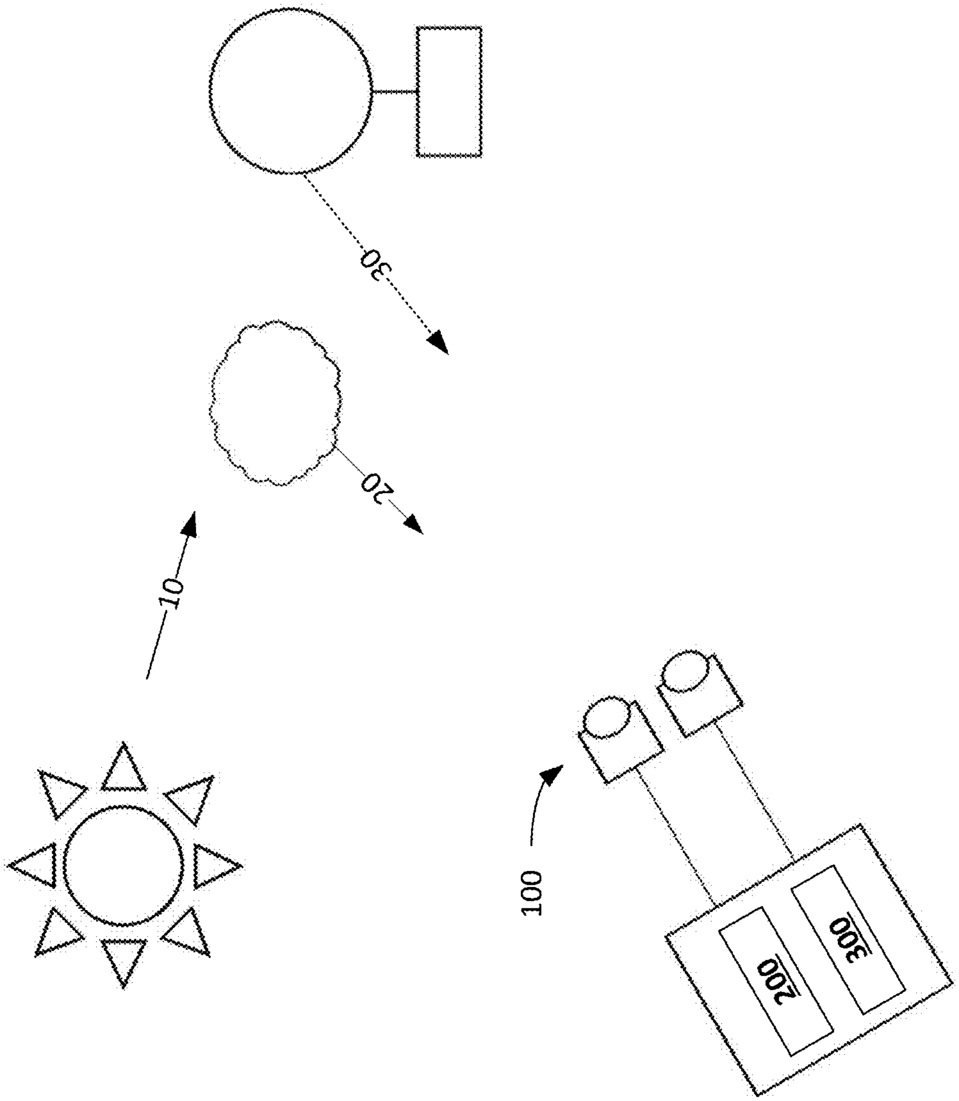
FIG. 1 shows exemplary illustration of an optical surveillance system for detecting airborne objects.

FIG. 1 shows exemplary illustration of an optical surveillance system for detecting airborne objects comprising, consisting of, or consisting essentially of a plurality of cameras 100, an image processing unit 200, and an object identification unit. The optical surveillance system is oriented towards an area of interest in the sky. The area of interest is at least partially exposed to light 10 and may further comprise a plurality of manmade or natural objects. Natural objects may be any that one could see in the sky, such as bird or clouds, but not so limited and largely do not polarize light incident upon them on them 20. Manmade objects 30 may be any that one could see in the sky, such as balloons, manned aerial vehicles, or unmanned aerial vehicles, but not so limited and may polarize light incident upon them.

The plurality of cameras 100 may further comprise, consist of, or consist essentially of an optical imaging device for capturing polarized 30 or non-polarized light 10 signals, such as a digital camera that collects images within its field of view. Additional examples include multiple digital cameras, cameras having one or more switchable filters, cameras having rotating filters, and prisms. Furthermore, the plurality of cameras 100 may comprise a plurality of lenses, which may be oriented towards an area of interests to be able to capture that area of interest within its field of view. The plurality of lenses may each have a unique polarization state, the states including a non-polarized lens, a linear filter in any orientation, or a circularly polarized filter in any orientation. As described above, the lenses may have interchangeable filters, such as filter wheels or rotating filters.

The plurality of cameras 100 are configured to record and send image data to an image processing unit 200 and/or an object identification unit. The image data may comprise, consist, or consist essentially of a plurality of concurrent images or light signals, each associated with a state of polarization. Furthermore, the image data may comprise images that are temporally concurrent, or proximately concurrent, comprising the associated temporal data.

In one embodiment, one or any of the plurality of cameras 100 may be selected from a group consisting of near infrared, multispectral, polarimeter, and short-wave infrared (SWIR) cameras. Cameras in this group may assist in the identification of airborne obfuscated by environmental factors. Combinations of different camera types aid in detection in different environmental conditions. For example, light or signal recorders operating at wavelengths longer than short-wave infrared to enhance scene characterization such as via enhanced visibility through clouds or aerosols, detection of objects with a stronger thermal signature than visible signature in the given lighting or scene conditions.

In another embodiment, at least one of the plurality of cameras 100 may be coupled to airborne vehicle. It is not required that the plurality of cameras are adjacently located, as they may be dispersed while still oriented to capture the area of interest to detect objects from different directions. When such dispersed cameras/systems detect the same object, the angles of the multiple detections can be compared to make additional inferences about the position of the detected object (i.e. multi-angulation). This also enables detection of objects at altitudes above some or all of the clouds Furthermore, the plurality of cameras 100 may utilize a scanning or pointing control mechanism.

In another embodiment, at least one of the plurality of the cameras are event-based including, but not limited to, neuromorphic imagers. Event-based, or neuromorphic, cameras conserve power and data by only transmitting information about pixels that have changed. For example, plurality of cameras may be responsive to movement or an instantaneous change in light. This may manifest by a bird or object passing through the area of interest or the sun could move to reflect off of a window, to provide simple examples.

The image processing unit 200 comprises a processor and a computer-readable storage medium. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted, or otherwise processed in a suitable manner if necessary, and then stored in a computer memory.

Furthermore, the image processing unit 200 configured to receive and store image data from the plurality of cameras 100. The image data may comprise a plurality of concurrent images each further comprising a plurality of pixels having pixel data, camera orientation information, and associated polarization states. Any of the cameras may need to be properly oriented towards the area of interest so that it is at least partially contained in their field of view. This area of interest would be selected by an operator as one they would like to assess for the presence of an aerial object. In one embodiment, the area of interest may be in the sky, but additional embodiments may be implemented near ground level.

The image processing unit 200 is further configured to align each of the plurality of concurrent images with respect to the area of interest. Even co-located and similarly oriented cameras may have slight misalignment in pixel-space (e.g. pixel (0,0) of camera 1 may correspond to pixel (5,7) in camera 2). In this case, it is often necessary to digitally realign the images so that proper comparison can be made between images. This may be accomplished via correlation of images captured of a reference scene by the multiple cameras or concurrent capture of a real-world scene, and the images correlated. In one embodiment, the result of aligning each of the plurality of pixels is an aligned polarization array. The polarization array comprises an array of measure of polarization of light incident upon one or more imaging devices. The measure of the polarization of light may be determined by image intensity as a percent of that associated with admitting light of all polarizations for a non-polarized optic viewing two object clusters.

The image processing unit 200 is further configured to determine a pixel-intensity value for each of the plurality of pixels within the plurality of concurrent images. Each pixel has an associated intensity, which responds differently to different polarizations. By analyzing the intensity of each of the pixels captured by lenses having different polarizations, a polarized surface may be detected as a quantifiable difference in intensity from a background intensity or relative intensity. In one embodiment, the pixel intensity may be compared to an expected or measured background intensity. In an embodiment having two polarization states, the calculation provides the difference between the pixel intensities. In another embodiment having two orthogonal polarizations (e.g. vertical and horizontal), a measure of the polarization can be calculated, for example the degree of polarization (DOP) by taking the absolute value of the difference between the two measures and dividing by their total or by an unfiltered reference.

The image processing unit 200 is further configured calculate a plurality of differential pixel intensities between at least one of the plurality of concurrent images associated with a first polarization state and at least one of the plurality of concurrent images associated with a second polarization state. The calculation may be performed by pixel-wise subtracting the intensities of the aligned pixels of different polarization array.

The image processing unit 200 is further configured to determine a plurality of pixel clusters associated differential pixel intensities exceeding an airborne object threshold, wherein the airborne object threshold is relative to the underlying scene. Because polarized light would be received having pixel different intestines with different polarized filters, any detected pixel intensity different could indicate the presence of a polarized surface. However, environmental factors, camera settings, lighting differences, magnitude of intensity difference, distance from the object, and additional factors may all contribute to the accuracy of the identification. Accordingly, an airborne object threshold would define the parameters of a positive detection based on these factors. Specifically, the threshold quantity and/or density of pixels is specified for the image processing unit 200 to make a positive determination of an airborne object. Accordingly, the determination of an airborne object would likely result in a plurality of pixels clusters, meaning a plurality of adjacent or near-adjacent pixels. Furthermore, the pixel intensity difference is relative to either a determination of background intensity derived from a non-polarized reference image from the scene, or is relative between at least two polarized images. In one embodiment, the underlying scene comprises the modeled or measured polarization of the natural background including sky, clouds, birds, horizon features, or other natural objects or phenomena.

The airborne object threshold, in one embodiment, may be a scalar value of the average background intensity. For example, a plurality of pixel intensities may be determined for a scene by determine a mean of all intensities in the scene. The threshold may then be set at, for example, 5% to 20% above mean pixel intensity, wherein incoming polarized light would exceed the threshold. The threshold may be tuned to improve fidelity of the image processing unit. In other words, when deployed to detect small or far airborne objects, the threshold would be lower and, thus, more sensitive. The threshold may then be actively tuned if too many false positives are detected or from failures to detect a present object.

The image processing unit 200 is further configured to identify the plurality of concurrent images associated with the plurality of pixel clusters exceeding the airborne object threshold, such that it makes a positive notification of the presence of a polarized surface and identifies the pixels related to the positive suggestion. The notification may include, for example noting or reporting image sets, corresponding times thereof, and/or regions thereof, not conforming to differential profiles expected of natural backgrounds and objects.

Figure 2A:
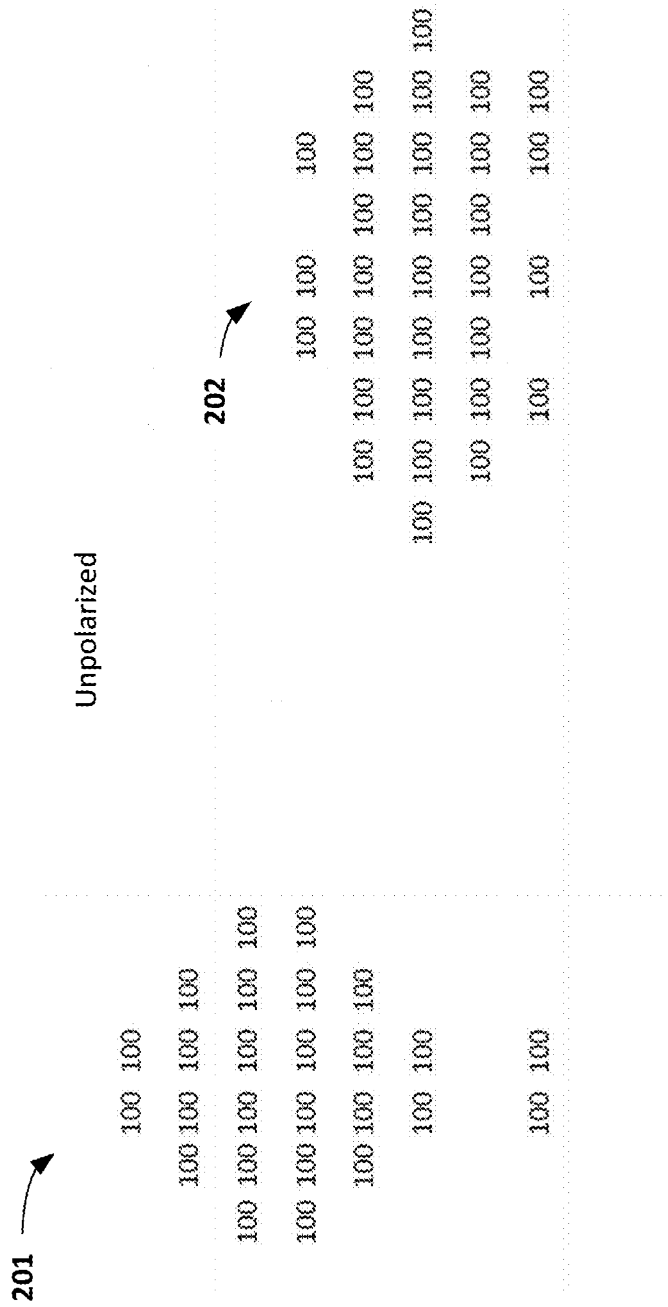
FIG. 2A shows an exemplary illustration of a polarization array comprising two pixel clusters captured with an unpolarized optic, the left cluster representing a man-made object and the right cluster representing a natural object.

FIG. 2A shows an exemplary illustration of a polarization array comprising two-pixel clusters captured with an unpolarized optic, the left cluster 201 representing a man-made object and the right cluster 202 representing a natural object. As described previously, polarization array comprises a plurality of pixel intensity values, where the values represent image intensity as a percent of that associated with admitting light of all polarizations for a non-polarized optic viewing two object clusters. The left cluster 201 suggests the form of a balloon and the right 202 suggests the form of a cloud. These are example objects and merely intended to illustrate the concepts herein, and are not limiting on this disclosure. Furthermore, the array as shown in FIG. 2A comprises a plurality of quantities associated with each light level. Any light level scaling or descriptions may be used including, but not limited to, 0-63, 0-255, 0-1023, etc. In one exemplary embodiment, the pixel intensity is encoded as a value between 0-255, where 8 bits (1 byte) stores each of the plurality of intensity values. Here, unpolarized balloon array 201 and unpolarized cloud array 202 have the same pixel intensities because they have been captured with the same lens type (i.e. polarization state). The polarization array based on non-polarized lens may assist wherein image content is compared against measured or expected scene background. Additional scenarios utilizing the disclosed system and method involving multiple polarization states are shown below.

Figure 2B:
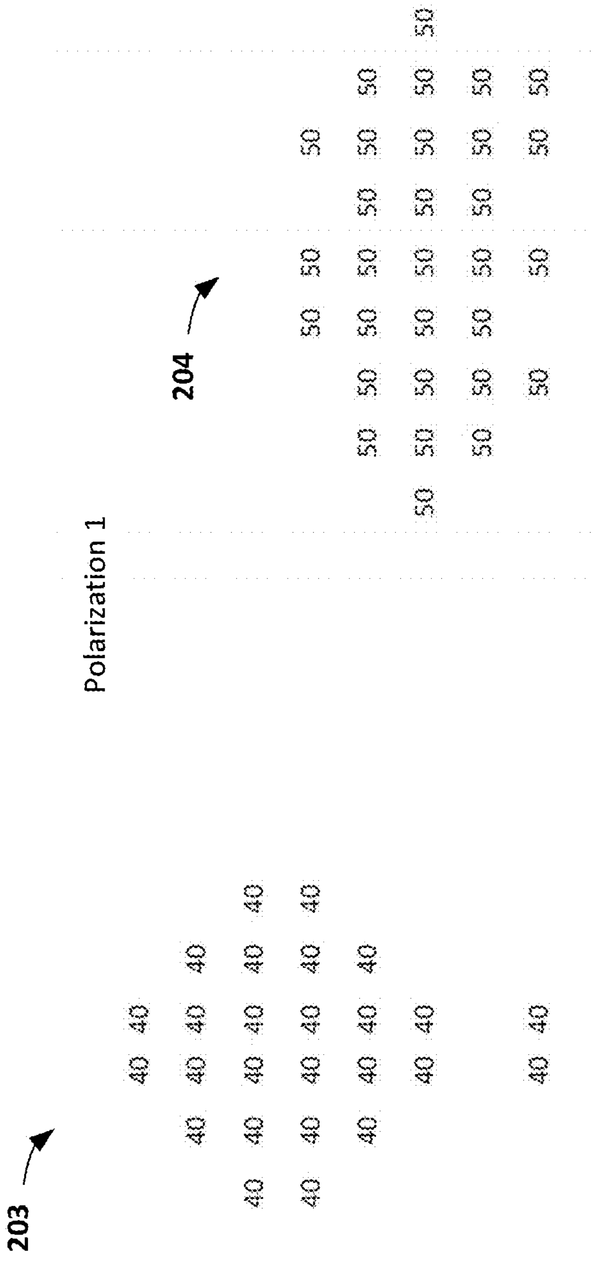
FIG. 2B shows an exemplary illustration of a polarization array comprising two pixel clusters captured with a first uniquely polarized optic, the left cluster representing a man-made object and the right cluster representing a natural object.

FIG. 2B similarly shows a second exemplary illustration of a polarization array comprising two pixel clusters, in this instance captured with a first uniquely polarized optic. This exemplary polarization array is derived from the same exemplary man-made object and natural object as shown in FIG. 2A. The left cluster 203 suggestive of the form of a balloon and the right 204 suggestive of the form of a cloud, each captured with an optic having a first unique polarization. The values of the two clusters in the exemplary array differ between the Polarization 1 balloon array 203 (40) and cloud array 204 (50) because of the reflective properties of flat surfaces, commonly found on man-made objects. As described previously, any detected pixel intensity different could indicate the presence of a polarized surface. A threshold may be set based on conditions that would materially impact light or signal detection and be selected subject to the user's preferred fidelity. As the detected pixel intensity increases, so the does the confidence level for a positive identification of a polarized surface. In typical conditions, a 10% different in pixel intensity threshold is sufficient for standard day-time lighting and camera conditions.

Figure 2C:
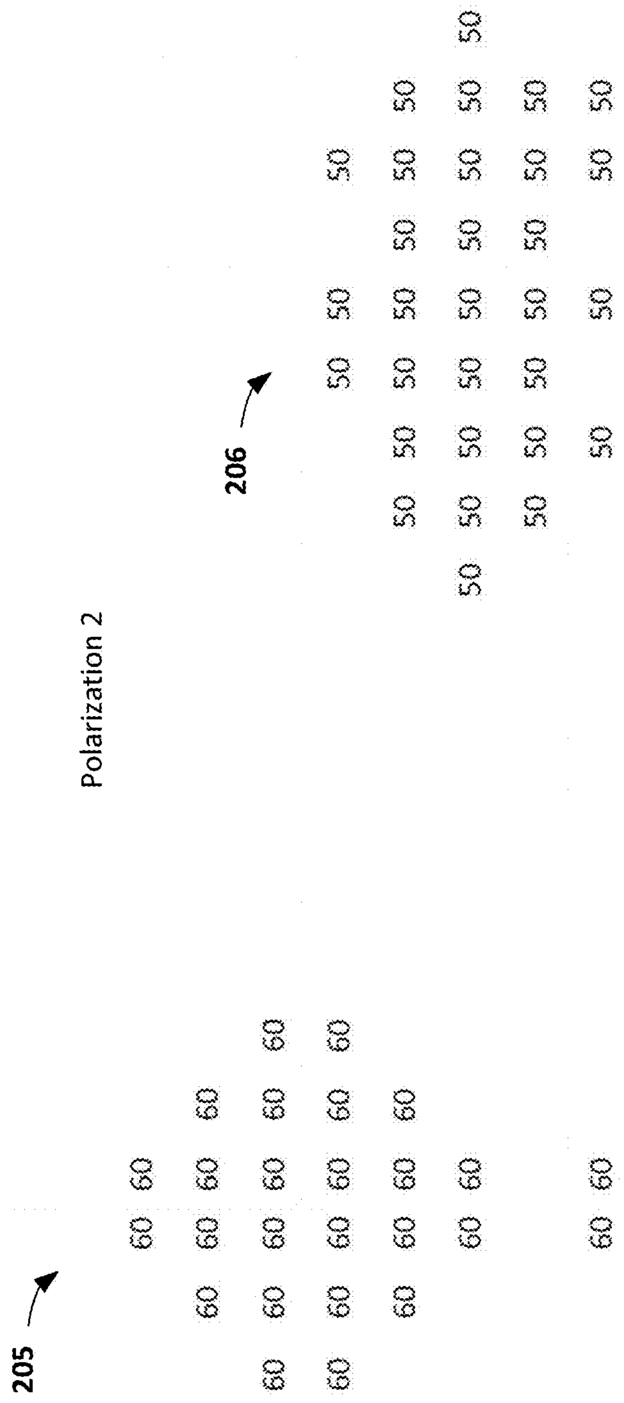
FIG. 2C shows an exemplary illustration of a polarization array comprising two pixel clusters captured with a second uniquely polarized optic, the left cluster representing a man-made object and the right cluster representing a natural object.

FIG. 2C shows a third exemplary illustration of a polarization array comprising two pixel clusters, in this instance captured with a second uniquely polarized optic. This exemplary polarization array is also derived from the same exemplary man-made object and natural object as shown in FIG. 2A. In this instance, the left cluster 204 is suggestive of the form of a balloon and the right 204 suggestive of the form of a cloud, each captured with an optic having a second unique polarization. Here, the values of the array again differ between the balloon array 205 (60) and cloud array 206 (50) because of the unique polarization. In comparing the differences between the arrays presented in FIG. 2A, 2B, and 2C, one can calculate a pixel intensity difference as described above.

An example calculation of a plurality of differential pixel intensities may including pixel-wise subtracting pixel intensities for each element in two arrays having different polarizations (e.g. Unpolarized as shown in FIG. 2A and Polarization 1 as shown in FIG. 2B). The resulting array comprises pixel differential intensities. Thereafter differential pixel intensities may be compared to a threshold, which if surpassed, indicates the presence of manmade airborne objects. Furthermore, clustering parameters may be included so that pixels that exceed a threshold, but are isolated, do not show as a positive indication. Instead, a pixel cluster must be present having a size determined and tunable by an operator.

In one embodiment, the image processing unit 200 wherein the apparent polarization of the imagery content as determined by comparison of images of differing polarization filtering or lack thereof may be compared to the modeled or measured polarization of the natural background including sky, clouds, birds, horizon features, or other natural objects or phenomena.

In addition to the plurality of cameras 100 and the image processing module 200, the system may also include an object identification unit 300 configured to receive and store image data, the image data further comprising a plurality of concurrent images, characterize a plurality of pixel clusters within the plurality of concurrent images suggestive of an object based on variables comprising image recognition, velocity, and trajectory, and identifying the plurality of pixel clusters suggestive of an object. In some embodiments, the object identification unit may further comprise computer vision module, weather data, 3D modeling module, aerial mapping data, a spectrometer, and a tracking module for characterizing or identifying objects within the field of view oriented towards the area of interest.

The object identification unit 300 integrates with the image processing module 200 so that a cluster of pixels that the image processing module 200 identified as exceeding the threshold may be analyzed for object identification. For example, the image processing module may detect a polarized surface of an airborne object and then the object identification unit 300 may identify the object with computer vision. Conversely, the object identification may be monitoring the sky for identifiable objects and detect an object, which may initiate an analysis in the image processing module 200 to determine if there is a polarization exceeding the threshold.

Figure 3:
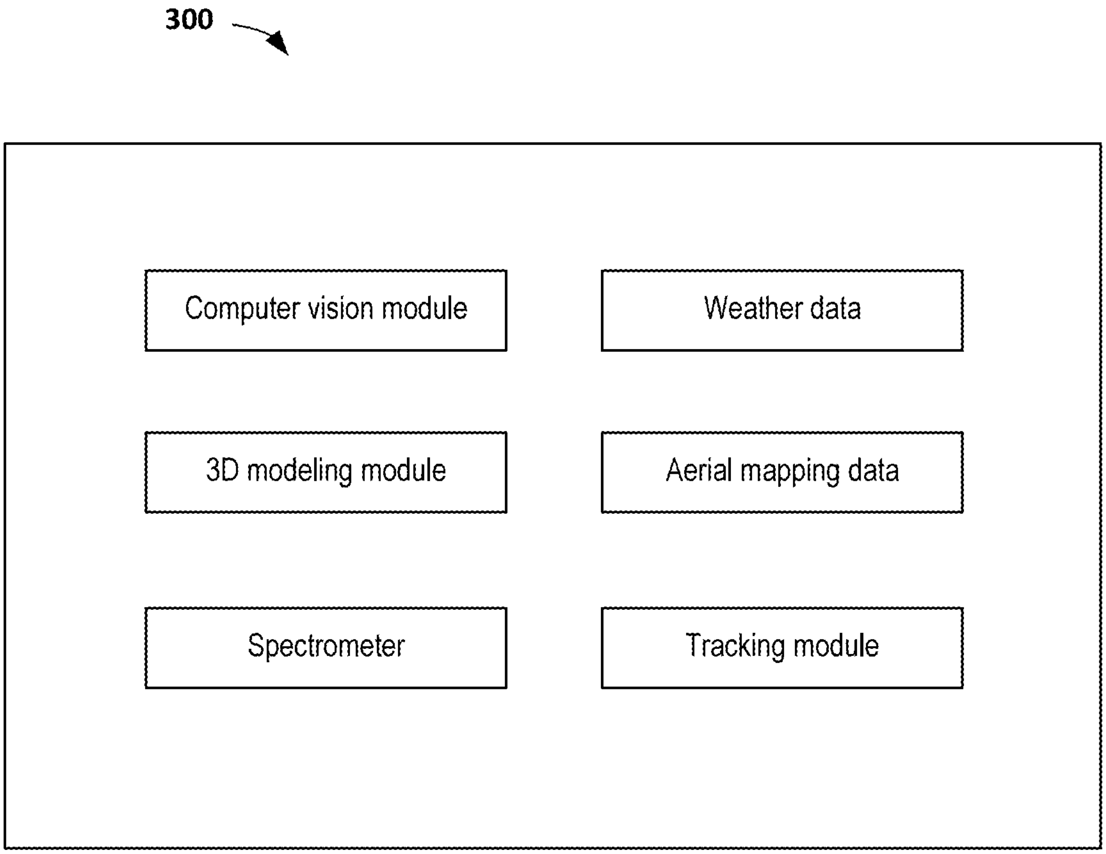
FIG. 3 is block-diagram illustration of a method for detecting airborne objects.

FIG. 3 shows a block-diagram illustration of an object identification unit 300 comprising a computer vision module, weather data, 3D modeling module, aerial mapping data, a spectrometer, and a tracking module for characterizing or identifying objects within the field of view oriented towards the area of interest. Characterizing or identifying objects within the field of view of the cameras and in the area of interest improves the confidence level of a positive identification of a polarized surface. In one embodiment, the object identification unit 300 utilizes computer vision to classify an imaged object (e.g. bird, airplane, building, etc.) with some confidence (e.g. 80%). This classification can then be used to reduce false positive detections of manmade objects of interest. For example, polarized light exceeding a threshold could be detected, but the computer vision classification could indicate that it comes from a bird flying close to the camera (not manmade) or a passing car (manmade but not of interest in some scenario). Furthermore, the object identification unit 300 may construct a simulated model of the area of interest, such as in two-dimensions or three-dimensions. Said simulation could further determine trajectory and velocity of an object of interest in the area of interest. The object of interest may be associated with pixel suggestive of a polarized surface, so as to enhance characterization or identification of that object or be applied to other objects in the area of interest. Additionally, machine learning could be applied to object recognition to further enhance recognition capabilities.

In another embodiment, the object identification unit 300 may receive, store, and utilize external image data to improve characterization capabilities and improve identification confidence. For example, the object identification unit may be configured to receive and store weather data including wind speed; and incorporate weather data into the trajectory and velocity estimations. Weather data, such as wind speed, may be applied to trajectory and velocity estimations to predict the path of the object more accurately. Because airborne objects have unique types of flight paths, they can often be identified as such. For example, planes, birds, balloons, and clouds all fly differently and could be classified based on their relative size, trajectories, and velocities. Furthermore, the object identification module may further comprise a spectrometer configured to observe a thermal spectrum of the area of interest and to further characterize an object of interest. Like trajectory and velocity, thermal signature is beneficial in object identification and may serve as a basis to classify objects.

In another embodiment, the object identification unit 300 may comprise a higher zoom camera configured to capture higher resolution imagery of the area of interest and to enhance characterization of the area of interest.

In another embodiment, the object identification unit 300 is configured to receive and process supplementary data to enhance characterization of the area of interest. Supplementary data may include, but is not limited to, radar, lidar, and Aerial Information Service (AIS) data to provide a more detailed, precise, and/or higher confidence characterization of the object. For example, a detected airborne object could be associated with a known commercial flight track from AIS data to identify that the detected object is a commercial airliner.

Figure 4:
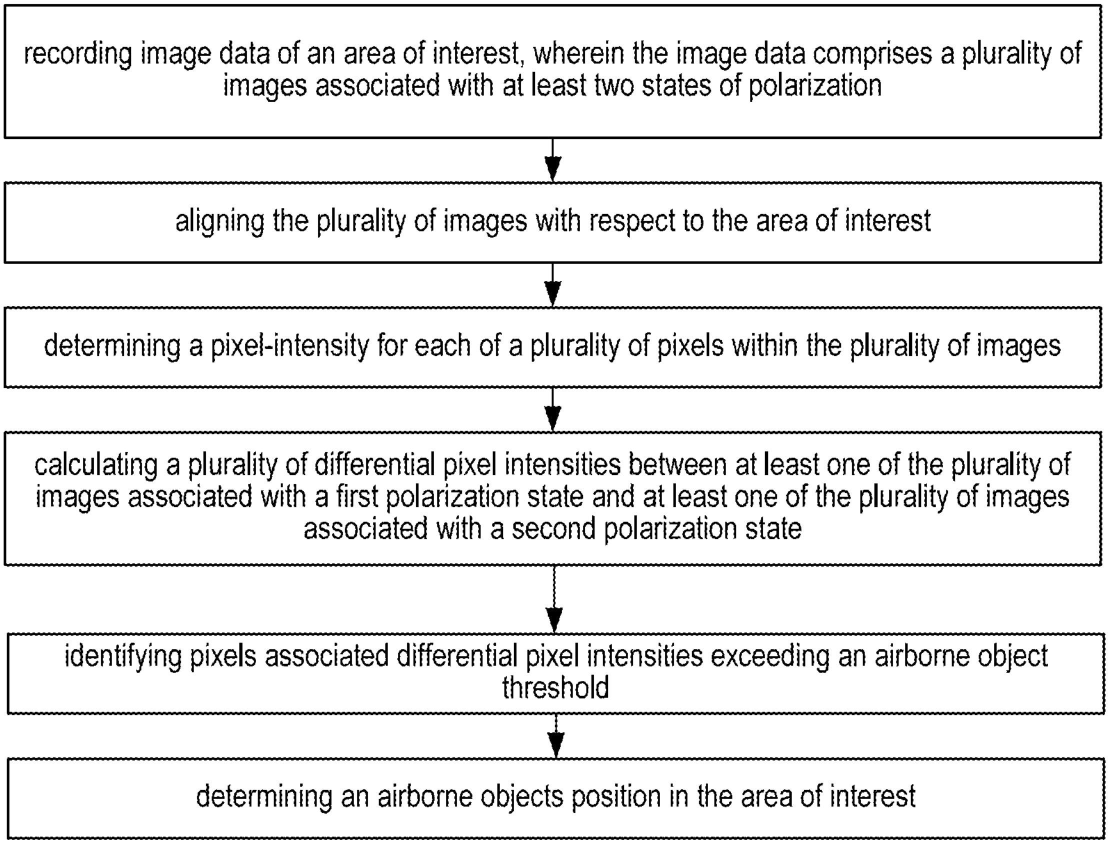
FIG. 4 is block-diagram illustration of a method for detecting airborne objects.

FIG. 4 is block-diagram illustration of a method for detecting airborne objects comprising recording image data of an area of interest, wherein the image data comprises a plurality of concurrent images associated with at least two states of polarization, aligning the plurality of concurrent images with respect to the area of interest, determining a pixel-intensity for each of a plurality of pixels within the plurality of concurrent images, calculating a plurality of differential pixel intensities between at least one of the plurality of concurrent images associated with a first polarization state and at least one of the plurality of concurrent images associated with a second polarization state, determining a plurality of pixel clusters associated the plurality of differential pixel intensities exceeding an airborne object threshold, wherein the airborne object threshold is relative to the underlying scene, and identifying the plurality of concurrent images associated with the plurality of pixel clusters exceeding the airborne object threshold.

The method for detecting airborne objects comprising of claim 12, further comprising: applying a plurality of optical tracking computational processes to characterize the movement of the plurality of airborne objects in the area of interest; and determining an estimated size of each of the airborne objects.

The method for detecting airborne objects may further comprise determining a plurality of environmental intensities associated with the area of interest; and comparing the plurality of environmental intensities with the plurality of differential intensities to determine a polarization threshold.

The method for detecting airborne objects may further comprise wherein the plurality of optical tracking computational processes comprise machine learning configured classify the airborne objects.

The method for detecting airborne objects may further comprise wherein the plurality of concurrent images further comprise a plurality of temporal characterizations of the scene.

The method for detecting airborne objects may further comprise modeling a three-dimensional to estimate size, trajectory, and/or velocity of objects of interest in the area of interest.

From the above description of optical surveillance system for detecting airborne objects and method for detecting airborne objects, it is manifest that various techniques may be used for implementing the concepts of an optical surveillance system for detecting airborne objects and a method for detecting airborne objects without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that an optical surveillance system for detecting airborne objects and a method for detecting airborne objects are not limited to the particular embodiments described herein, but is capable of many embodiments without departing from the scope of the claims.

What is claimed:

1. An optical surveillance system for detecting airborne objects, the system comprising:

a plurality of cameras having at least two states of polarization configured to record image data of an area of interest, wherein at least one of the plurality of cameras is an event-based neuromorphic imager configured to transmit information associated with pixels that have changed;

an object identification unit, configured to receive and store image data, the image data further comprising a plurality of concurrent images, and characterize a plurality of pixel clusters within the plurality of concurrent images suggestive of an object based on variables comprising image recognition, velocity, and trajectory;

identifying the plurality of pixel clusters suggestive of an object; and an image processing unit, configured to receive and store image data comprising a plurality of concurrent images associated with the at least two states of polarization, align the plurality of concurrent images with respect to the area of interest, determine a pixel-intensity for each of a plurality of pixels within the plurality of concurrent images, calculate a plurality of differential pixel intensities between at least one of the plurality of concurrent images associated with a first polarization state and at least one of the plurality of concurrent images associated with a second polarization state, determine a plurality of pixel clusters associated the plurality of differential pixel intensities exceeding an airborne object threshold, wherein the airborne object threshold is relative to the underlying scene, and identify the plurality of concurrent images associated with the plurality of pixel clusters exceeding the airborne object threshold.

2. The optical surveillance system for detecting airborne objects of claim 1, wherein the object identification unit further comprises a computer vision module configured to classify the objects detected.

3. The optical surveillance system for detecting airborne objects of claim 1, wherein the object identification unit further comprises a tracking module to computationally estimate a trajectory and a velocity of an object of interest.

4. The optical surveillance system for detecting airborne objects of claim 3, wherein the object identification unit is configured to receive and store weather data including wind speed; and incorporate weather data into the trajectory and velocity estimations.

5. The optical surveillance system for detecting airborne objects of claim 3, wherein the computer vision module further comprises a machine learning module configured to classify the objects detected.

6. The optical surveillance system for detecting airborne objects of claim 1, wherein the plurality of cameras are coupled to an airborne vehicle.

7. A method for detecting airborne objects comprising:

recording image data of an area of interest, wherein the image data comprises a plurality of concurrent images associated with at least two states of polarization;

aligning the plurality of concurrent images with respect to the area of interest;

determining a pixel-intensity for each of a plurality of pixels within the plurality of concurrent images;

calculating a plurality of differential pixel intensities between at least one of the plurality of concurrent images associated with a first polarization state and at least one of the plurality of concurrent images associated with a second polarization state;

determining a plurality of pixel clusters associated the plurality of differential pixel intensities exceeding an airborne object threshold, wherein the airborne object threshold is relative to the underlying scene; and identifying the plurality of concurrent images associated with the plurality of pixel clusters exceeding the airborne object threshold.

8. The method for detecting airborne objects comprising of claim 7, further comprising:

applying a plurality of optical tracking computational processes to characterize the movement of the plurality of airborne objects in the area of interest; and determining an estimated size of each of the airborne objects.

9. The method for detecting airborne objects comprising of claim 7, further comprising:

determining a plurality of environmental intensities associated with the area of interest; and comparing the plurality of environmental intensities with the plurality of differential intensities to determine a polarization threshold.

10. The method for detecting airborne objects comprising of claim 7, wherein the plurality of optical tracking computational processes comprise machine learning configured classify the airborne objects.

11. The method for detecting airborne objects comprising of claim 7, wherein the plurality of concurrent images further comprise a plurality of temporal characterizations of the scene.

12. The method for detecting airborne objects comprising of claim 7, further comprising:

modeling a three-dimensional to estimate size, trajectory, and/or velocity of objects of interest in the area of interest.

13. An imaging system for detecting airborne objects, the system comprising:

a plurality of cameras having at least two states of polarization configured to record image data of an area of interest, wherein at least one of the plurality of cameras is an event-based neuromorphic imager configured to transmit information associated with pixels that have changed;

an image processing unit, configured to receive and store image data comprising a plurality of concurrent images associated with the at least two states of polarization, align the plurality of concurrent images with respect to the area of interest, determine a pixel-intensity for each of a plurality of pixels within the plurality of concurrent images, calculate a plurality of differential pixel intensities between at least one of the plurality of concurrent images associated with a first polarization state and at least one of the plurality of concurrent images associated with a second polarization state, determine a plurality of pixel clusters associated the plurality of differential pixel intensities exceeding an airborne object threshold, wherein the airborne object threshold is relative to the underlying scene, and identify the plurality of concurrent images associated with the plurality of pixel clusters exceeding the airborne object threshold.

* * * * *